United States Patent [19]
Sugiyama et al.

[11] 3,901,858
[45] Aug. 26, 1975

[54] TWO-COMPONENT COMPOSITION

[75] Inventors: Iwakichi Sugiyama, Narashino; Kiyoshi Endo, Ichikawa, both of Japan

[73] Assignee: Matsumoto Seiyaku Kogyo Kabushiki Kaisha, Chiba, Japan

[22] Filed: Feb. 26, 1974

[21] Appl. No.: 446,106

Related U.S. Application Data

[63] Continuation of Ser. No. 203,874, Dec. 1, 1971, abandoned.

[30] Foreign Application Priority Data

Dec. 4, 1970  Japan............................ 45-107438

[52] U.S. Cl. .......... 260/80.72; 117/128.4; 117/161; 260/77.5 CR; 260/78.5 UA; 260/80.73; 260/80.81; 260/86.1 E
[51] Int. Cl.$^2$........................................... C08F 15/16
[58] Field of Search ....... 260/86.1 R, 86.1 E, 80.72, 260/80.73, 80.81

[56] References Cited
UNITED STATES PATENTS

| | | |
|---|---|---|
| 3,290,257 | 12/1966 | Bader et al..................... 260/89.5 R |
| 3,435,012 | 3/1969 | Norlander...................... 260/89.5 R |
| 3,454,543 | 7/1969 | Rai et al........................ 260/89.5 R |
| 3,651,036 | 3/1972 | Watanabe et al............. 260/89.5 R |

*Primary Examiner*—Harry Wong, Jr.
*Attorney, Agent, or Firm*—Wenderoth, Lind & Ponack

[57] ABSTRACT

In a composition of a type furnished in two separate parts, which are mixed together just prior to use as, for example, an adhesive, there is provided a first component containing a monomeric base consisting of at least one of the class of vinyl compounds which are available in liquid or solid form, and a metal chelate compound selected from among β-diketone chelates and ketoester chelates of various metals. A second component is provided which also includes a monomeric base consisting of at least one of the aforesaid class of vinyl compounds, and a peroxide which, by itself, does not cause the latter monomeric base to harden at room temperature. The first and second components may each contain further a stabilizer and, if desired, a hardening accelerator as additives.

8 Claims, No Drawings

TWO-COMPONENT COMPOSITION

This is a continuation of application Ser. No. 203,874, filed December 1, 1971, and now abandoned.

BACKGROUND OF THE INVENTION

This invention relates generally to chemical compositions, and more particularly to a new two-component composition which, when the two components are mixed together, readily hardens at room temperature. One of the components contains a monomeric vinyl compound as a base and a peroxide, while the other component contains a monomeric vinyl compound as a base and a metal chelate compound.

Compositions which are stable over long periods while in contact with air but polymerize and harden when air (or oxygen) are removed therefrom are being widely used as anaerobic adhesives for fixing bolts and screws and as fixing seals for various fitted parts.

As disclosed in Japanese Patent Publication Nos. 3348/1954, 2393/1960, 852/1965, and 12400/1970, these anaerobic adhesives are furnished in single, self-sustained compositions (as compared with two-component compositions like that of this invention) having acrylates (including methacrylates) of polyethers, polyols, urethane, and polyesters, etc. as basic agents, to which additives such as peroxides, accelerators, and stabilizers have been added. When an adhesive of this character is applied, for example, as coating on a bolt, and a nut is engaged with and tightened on the bolt, air is excluded from the adhesive, which thereupon hardens in a period of from a few hours to approximately 24 hours and attains its practical strength.

This hardening action of these adhesives is excellent on surfaces of iron, copper and alloys containing these metals but requires an inordinately long time on the surfaces of metals such as zinc, tin, lead, cadmium, and chromium and synthetic resins. While the reason for this difference is not clear, it is considered that the hardening which is attained on iron and copper surfaces is not exhibited on surfaces of metals such as zinc. Accordingly, in order to cause an anaerobic adhesive of this character to harden in a shorter time in all cases, including that of iron and copper materials, it is necessary to treat the materials beforehand with a hardening accelerator or to carry out heating.

Thus, known anaerobic adhesives of the above described class are still accompanied by problems such as longer hardening times than cyanoacrylate adhesives and the impossibility of using these adhesives in places other those of a form wherein air can be effectively shut out. That these problems exist is regretable since, otherwise, these anaerobic adhesives possess the advantageous feature of generally excellent properties such as adhesiveness, resistance to chemicals and water, sealing property, and heat resistance.

While differing somewhat from an adhesive in the form of a combination of an anaerobic adhesive and a hardening accelerator, there is also a known type of adhesive which is supplied in two separate parts, that is, a main adhesive and a hardening accelerator. This type of adhesive is used by first pretreating with the accelerator the articles to be bonded and then to bond these articles with the main adhesive. A specific example of an adhesive of this type, which exhibits a hardening time approaching that of a cyanoacrylate adhesive, is Loctite Minute-Bond Adhesive 312 manufactured by the Loctite Corporation. This type of adhesive, however, requires a primer process step and is said to have various shortcomings such as difficulty of use with articles and in places where primer treatment is difficult.

If it were possible to make composite materials of composition which do not contain solvents and which undergo rapid hardening at room temperature through the use of acrylic and methacrylic esters exhibiting unique properties, such materials could be expected to be industrially useful. For example, such materials would be useful as adhesives and could be used in various fabrication processes such as casting, embedment, and coating which are practiced in the case of epoxy resins and polyester resins.

Accordingly, we have carried out research with respect to compositions of this nature. As a result, we have found that when a mixture of a vinyl-type compound monomer selected from a group of such monomers, of which acrylic and methacrylic esters are principal representatives, as a main base, and an organic peroxide is mixed with a composition comprising the above mentioned base and a metal chelate compound of a certain type, the resulting product readily hardens at room temperature in a period of from several seconds to approximately 20 minutes even in the presence of air and exhibits useful properties.

The following disclosures are referred to as conducive to a full understanding of this invention. The results on research on the polymerization of various vinyl compounds through the use of metal chelate compounds are reported by C. H. Bamhford and others in Trans. Faraday Soc., Vol. 59, 2548 (1963) with respect to the polymerization of methyl methacrylate wherein a copper chelate compound is used, by E. G. Kastning and others in Angew. Chem. Vol. 77, 313 (1965) with respect to the polymerization of styrene, vinyl acetate, and the like through the use of chelate compounds of metals such as manganese and cobalt, and by several other investigators with respect to various examples of like polymerization.

As indicated in the above mentioned report of Kastning and others and in the report by Niskikawa and others in "Kogyo-Kagaku Zasshi" (Journal of Chemical Society of Japan Industrial Chemistry Section) Vol. 73,796 (1970), it cannot be concluded that all metal chelate compounds can be used in these polymerization reactions. Furthermore, it is necessary during these reactions to heat the polymerization system or to use therein a special accelerator, and the polymerization yield is not necessarily high in all cases. Consequently, it cannot be said that metal chelate compounds have reached the stage where they have practical value for utilization as catalysts for polymerization of vinyl-type monomers such as styrene and methyl methacrylate.

As a result of our research on the polymerization of polyethylene glycol dimethacrylate and polyol methacrylate through the use of metal chelate compounds, we have discovered that chelate compounds of metals such as aluminum, titanium, vanadium, chromium, manganese, iron, cobalt, nickel, and copper, per se, do not exhibit polymerization activity or particularly strong activity but, when combined with a composition containing an organic peroxide, exhibit a unique and pronounced polymerization activity. Utilizing this discovery, we have developed the composition of this invention.

SUMMARY OF THE INVENTION

It is an object of the present invention to provide a new and better two-component composition to be used for adhesion, embedment, casting, and many other applications with equally superior performance characteristics.

Another object of the invention is to provide a two-component resin composition of the class referred to such that the two components, which are stable while being kept separately at room temperature, are readily converted into a transparent resin when mixed together in approximately equal amounts.

A further object of the invention is to provide a two-component resin composition of the class referred to, which suffers little shrinkage on hardening.

Other objects will appear hereinbelow.

According to the present invention, briefly summarized in its broader aspects, there is provided a resin composition of a type furnished in two separate components, which are mixed together just prior to use. The composition comprises a first component and a second component, the first component containing a monomeric base consisting of at least one of the class of vinyl compounds which are available in other than gaseous form, and a metal chelate compound selected from the group consisting of β-diketone chelates and ketoester chelates of metals, and the second component containing a monomeric base consisting of at least one of the aforementioned class of vinyl compounds, and a peroxide which by itself does not cause the latter monomeric base to harden at room temperature.

The nature, principle and utility of this invention will be more readily apparent from the following detailed description.

DETAILED DESCRIPTION

Vinyl compounds employable, either independently or in combination of two or more, as a base of each of the two components making up the composition of this invention include di- or polyester monomers of acrylic and methacrylic acids such as, for example, ethylene glycol dimethacrylate, diethylene glycol dimethacrylate, diethylene glycol diacrylate, tetraethylene glycol dimethacrylate, trimethylol propane trimethacrylate, pentaerythritol tetramethacrylate, dimethacrylate bis (ethylene glycol) phthalate, and the reaction product of toluene diisocyanate and 2-hydroxyethyl methacrylate, as well as the ester monomers of acrylic and methacrylic acids such as, for example, methyl methacrylate, butyl acrylate, 2-hydroxyethyl methacrylate, glycidyl methacrylate, and methylolacrylamide. Additionally, vinyl acetate, styrene, and their derivatives such as, for example, divinyl benzene are also employable, but it is preferable that these vinyl compounds be used in combination with the esters of the acrylic and methacrylate acids listed in the foregoing. Vinyl chloride is unemployable since it is a gas at room temperature. Hence, substantially all monomeric vinyl compounds which are available in other than gaseous form can be used as the base of each of the two components, whether such vinyl compounds be liquid, solid, semisolid, or paste.

To the base selected from such monomers is added the β-diketone chelate or ketoester chelate of such a metal as copper, zinc, aluminum, titanium, vanadium, chromium, manganese, iron, cobalt, or nickel, or more desirably, of one of the metallic elements assigned the Periodic Table or belonging to the group of metals, called transition metals. Examples of such a metal chelate compound in the Periodic Table. Examples of such a metal chelate compound include acetylacetone chelate, methylchelate peracetic acid, copper acetylacetonate, and diisopropoxytitan bis (methyl acetoacetonate). The base is further provided with a stabilizer such as, for example, p-benzoquinone, and, if desired, a hardening accelerator, for example, amides such as NN' dimethylformamide, amines such as triethylamine and n-butylamine, carboxylic acids such as methacrylic acid and carboxylic anhydrides such as hexahydrophthalic anhydride. A first component, hereinafter referred to as component A, is thus formed which comprises 100 parts of the monomeric base, from about 0.001 to 5 parts of the metal chelate compound, from about 0.001 to 0.5 part of the stabilizer, and, if desired, a suitable amount of the hardening accelerator.

Separately, a second component, hereinafter referred to as Component B, is formed which comprises 100 parts of a monomeric base selected from the above listed vinyl compounds, from about 0.1 to 10 parts of a peroxide which exhibits no substantial polymerization activity with the monomeric base at or near room temperature, from about 0.001 to 0.2 part of a stabilizer such as p-benzoquinone, and, if desired, a suitable amount of a hardening accelerator. The peroxide which exhibits no substantial polymerization activity with the monomeric base at or near room temperature is selectable from the group including cumene hydroperoxide, t-butyl hydroperoxide, di-t-butyl peroxide, di-t-butyl diperphthalate, t-butyl peracetate, and methylethylketone peroxide. The hardening accelerator in this component B may be selected from the group including NN' dimethylformamide, dimethyl paratoluidine, and tri-n-butylamine.

Both or either of Components A and B may be further provided with a filler, a thickening agent, a modifier and the like, such as urethane, polyester, epoxy, alkyd, polyvinyl acetate, polyvinyl alcohol and its derivatives, polyvinyl pyrrolidone and cellulose ester, if such an additive does not adversely effect the polymerizing capability and preservability of Components A and/or B. Although, in the formation of Component A, the use of a preformed metal chelate compound is desirable in view of the simpler procedure involved, a metal and a suitable chelating agent may be separately added so as to form the desired metal chelate compound within the finally produced Component A.

These separately formed Components A and B constitute, in combination, the composition of this invention. Although Components A and B are each stable at room temperature, exhibiting substantially no polymerization activity either in the presence or absence of air, they are converted into a transparent resin within several tens of seconds to 20 minutes or so at room temperature in the presence of air when approximately equal amounts of the both components are mixed together. It is not necessary to mix exactly equal amounts of the components to achieve the desired resinification. The mixed components, when used for fixation of various bolts, have proved to readily provide the required bonding strength.

We have further conducted a series of experiments to test the performance characteristics of the composition as employed for embedment and casting purposes. In these experiments, a bar of mild steel with a diameter of 10 millimeters and a length of 40 millimeters was placed in the middle of a can, similarly made of mild steel, with a diameter of 20 millimeters and a depth of 20 millimeters. A sample of the composition of the mixed Components A and B was poured into the can to measure the length of time required for the hardening of the sample and the load needed for the pullout of the bar. It has been resultantly proved that the composition of this invention hardens at room temperature within several tens of seconds to about 20 minutes, and that a load of from about 200 to 600 kilograms is required for pulling the bar out of the can. These results demonstrate the fact that the composition suffers little shrinkage on hardening and has excellent bonding strength.

As disclosed hereinbefore, the present invention provides an improved two-component resin composition of a type hardenable at room temperature, which is applicable for adhesion, embedment, casting, and many other industrial as well as household uses. Practical examples of this improved composition are described hereinbelow by way of illustration of the invention.

EXAMPLE 1

Component A-1 was prepared by uniformly dissolving 0.05 part of p-benzoquinone and 0.3 part of vanadium oxyacetylacetonate in 100 parts of tetraethylene glycol dimethacrylate. Component B-1 was separately prepared by uniformly dissolving 0.05 part of p-benzoquinone and 5 parts of cumene hydroperoxide in 100 parts of tetraethylene glycol dimethacrylate. Both Components were stable for more than four months when kept separately in a cool dark place.

Four cubic centimeters each of Components A-1 and B-1 were poured into a test tube and mixed at room temperature to test the hardenability of the resultant composition. A transparent resin was formed in from 50 to 70 seconds at a temperature of about 26°C. 5 hours later, this polymerization product exhibited a Rockwell hardness of 88 (M scale) at a temperature of 24°C (61% RH). The hardenabilities of other samples of the composition, respectively formed by mixing 6 cubic centimeters of Component A-1 and 3 cubic centimeters of Component B-1 and by mixing 3 cubic centimeters of Component A-1 and 6 cubic centimeters of Component B-1, were equally good, as these samples also hardened into a transparent resin in from 50 to 70 seconds.

The performance characteristics of the mixture of approximately equal amounts of Components A-1 and B-1, as used for embedment and casting purposes, were tested by use of the previously described can and bar. The composition hardened in from 90 to 120 seconds, and a force of about 600 kilograms was required for pulling the bar out of the can. These results indicate that the volumetric shrinkage of the resin composition is small during its hardening, and its adhesive strength is high, whereby this composition is high suitable for embedment, casting and coating processes.

The composition of Components A-1 and B-1 was used for fixation of three-eighth inch, class-2 bolts, as specified by Japanese Industrial Standards (JIS), with their corresponding nuts (nut tightening torque, 0 kg-cm). The results were satisfactory for all practical purposes, as tabulated in the following. In the table, the numerical quantities indicate breakthrough torques in kilogram-centimeters at 28°C as measured by a torque-meter (KANNON-TMK 50) manufactured by Nakamura Works, of Tokyo.

| Material | Elapsed Time | | |
|---|---|---|---|
| | 3 min. | 30 min. | 24 hr. |
| Mild steel | 70 | 200 | 320 |
| Chromium plated | 55 | 160 | 280 |
| Copper plated | 70 | 210 | 360 |

The resistance of the composition to water and chemicals was also good, as may be seen from the following table.

| Test Agent | Immersion Time, days | Breakthrough Torque, kg-cm* |
|---|---|---|
| Toluene | 2 | 330 |
| Acetone | 2 | 300 |
| Methanol | 2 | 310 |
| Ethyl acetate | 2 | 340 |
| 10% NaOH | 2 | 300 |
| 10% H₂SO₄ | 2 | 290 |
| Water | 2 | 320 |
| ,, | 7 | 350 |

*At a temperature of from 26 to 20°C. (n = 5)

Examples 2 to 14
Components A-2 to A-14 were formed similarly as in Example 1 and as indicated in the following table

| Component | Monomeric Base (100 parts) | Metal Chelate Compound | Additive*1 |
|---|---|---|---|
| A-2 | 4GM | Cu(II) acetylacetonate (0.4 part) | n-butylamine (1 part) |
| A-3 | 4GA + HEMA (1:1) | Ti(IV) O-acetylacetonate (0.5 part) | n-butylamine (1 part) |
| A-4 | TMP + GMA (1:1) | Mn(II) acetylacetonate (0.4 part) | triethylamine (1 part) |
| A-5 | 4GM + vinyl acetate (1:1) | V (V) O-acetylacetonate (0.3 part) | — |
| A-6 | HEMA | Co(III) acetylacetonate (0.3 part) | — |
| A-7 | 3GM + styrene (3:1) | Cr(III) acetylacetonate (0.5 part) | dimethylformamide (2 parts) |
| A-8 | 2GM + MMA (2:1) | VO - acetylacetonate (0.3 part) | dimethylaniline (1 part) |
| A-9 | 1GM | TMAA (0.5 part) | triethylamine (1 part) |
| A-10 | 4GM | Fe(III) methyl acetoacetonate (0.4 part) | triethylamine (1 part) |
| A-11 | 4GM | MoO₂ - acetylacetonate (0.5 part) | — |
| A-12 | MEP | VO - acetylacetonate (0.5 part) | — |
| A-13 | TDI-HEMA + MMA (1:1) | VO - acetylacetonate (0.3 part) | — |
| A-14 | 4GM + vinyl acetate polymerized*2 | VO - acetylacetonate (0.3 part) | — |

*1 Components A-2 to A-14 were each further admixed with 0.05 part of p-benzoquinone.
*2 Five percent of a vinyl acetate polymer was added to increase the viscosity of the product to about 200 centipoise at 26°C.

The abbreviations used in the foregoing table stand, respectively, for the following compounds.

4GM = Tetraethylene glycol dimethacrylate.
HEMA = 2-hydroxyethyl methacrylate
4GA = Tetraethylene glycol diacrylate
TMP = Trimethylol propane trimethacrylate
GMA = Glycidyl methacrylate
3GM = Triethylene glycol dimethacrylate
2GM = Diethylene glycol dimethacrylate
1GM = Ethylene glycol dimethacrylate TDI-HEMA = Urethane acrylate produced by the reaction of toluene diisocyanate and 2-hydroxyethyl methacrylate according to the process disclosed in Example 1 of Japanese Patent Publication No. 12400/1970.

Approximately equal amounts of each of these Components A-2 to A-14 and the Components B-1 of the foregoing Example 1 were mixed to test the performance characteristics of the resultant compositions by the means described already. The results were as follows.

| Example No. | Component | *1 Hardening Time, min. | Pullout Strength *2 | | Breakthrough Torque *3 | |
|---|---|---|---|---|---|---|
| | | | Time | Load, kg. | Time | Torque, kg-cm. |
| 2 | A-2 | 5 – 6 | 10 min. | 180 | 5 min. | 50 |
| | | | 12 hr. | 530 | 30 min. | 210 |
| 3 | A-3 | 6 – 8 | 15 min. | 120 | 10 min. | 55 |
| | | | 12 hr. | 400 | 60 min. | 190 |
| 4 | A-4 | 7 – 9 | 15 min. | 100 | 10 min. | 45 |
| | | | 12 hr. | 480 | 2 hr. | 250 |
| 5 | A-5 | 10 – 13 | 15 min. | 80 | 15 min. | 50 |
| | | | 24 hr. | 550 | 2 hr. | 190 |
| 6 | A-6 | 10 – 13 | 15 min. | 70 | 15 min. | 40 |
| 7 | A-7 | 15 – 17 | 20 min. | 80 | 20 min. | 50 |
| 8 | A-8 | 5 – 6 | 10 min. | 150 | 5 min. | 40 |
| | | | 6 hr. | 520 | 60 min. | 220 |
| 9 | A-9 | 10 – 13 | 20 min. | 60 | 20 min. | 80 |
| 10 | A-10 | 10 – 13 | 20 min. | 120 | 20 min. | 90 |
| 11 | A-11 | 8 – 10 | 15 min. | 110 | 15 min. | 90 |
| | | | 12 hr. | 480 | 60 min. | 180 |
| 12 | A-12 | 5 – 6 | 10 min. | 105 | 5 min. | 40 |
| | | | 6 hr. | 430 | 60 min. | 210 |
| 13 | A-13 | 5 – 6 | 10 min. | 160 | 5 min. | 80 |
| | | | 6 hr. | 520 | 60 min. | 240 |
| 14 | A-14 | 5 – 6 | 10 min. | 120 | 5 min. | 70 |
| | | | 12 hr. | 410 | 60 min. | 220 |

*1 Hardening time is the length of time required for the hardening of about 4 cubic centimeters each of Components A and B mixed together in a test tube at room temperature (from 20 to 26°C).
*2 Pullout load was measured according to the procedure described in Example 1, at a temperature of from 25 to 26°C.
*3 Breakthrough torque is the average of torques required for ¼, ½ and ¾ turns, respectively, in the loosening direction of a nut previously tightened at 0 kg-cm on a ⅜", class-2 bolt (JIS specification) of mild steel after this bolt has been coated with a mixture of approximately equal amounts of Components A and B.

TMAA = Diisopropoxytitan bis (methyl acetoacetonate)
MEP = Dimethacrylate bis (ethylene glycol) phthalate

EXAMPLES 15 to 17

Components A-15 to A-17 and Components B-2 to B-4 were formed as indicated in the tables given below:

Components A

| Component | Monomeric Base (100 parts) | Metal Chelate Compound | Additive* |
|---|---|---|---|
| A-15 | 4GM | VO - acetylacetonate (0.3 part) | n-butylamine (1 part) |
| A-16 | 4GM + TMP (1:1) | VO - acetylacetonate (0.3 part) | maleic acid anhydride (2 parts) dimethyl paratoluidine (1 part) |

*0.03 part of p-benzoquinone is further added to Components A-15 and A-16 as stabilizer.

Components B

| Component | Monomeric Base (100 parts) | Peroxide | Additive *1 |
|---|---|---|---|
| B-2 | 4GM | t-butyl peracetate*²(5 parts) | dimethyl paratoluidine (1 part) |
| B-3 | 4GM | di-t-butyl peroxide (4 parts) | dimethyl paratoluidine (1 part) |
| B-4 | 4GM | methylethylketone peroxide (5 parts) | — |

*¹0.03 part of p-benzoquinone is further added to Components B-2 to B-4 as a stabilizer.
*²In 30% benzene solution.

| Example No. | Components | | Hardening Time, min. | Pullout Strength | | (Temperature, 28°C) Breakthrough Torque | |
|---|---|---|---|---|---|---|---|
| | A | B | | Time, min. | Load, kg. | Time, min. | Torque, kg-cm |
| 15 | A-15 | B-2 | 5 – 6 | 15 | 130 | 15 | 70 |
| 16 | A-16 | B-3 | 10 – 13 | 20 | 105 | 20 | 80 |
| 17 | A-16 | B-4 | 8 – 10 | 15 | 180 | 15 | 110 |

Examples 18 and 19
Components A-17 and A-18 were formed as indicated below:

| Component | Monomeric Base (100 parts) | Metal Chelate Compound | Additive*1 |
|---|---|---|---|
| A-17 | 3GM | TAA*2 (0.3 part) | triethylamine (2 parts) |
| A-18 | 3GM | TPT*3 (0.28 part) acetylacetone (0.2 part) | triethylamine (2 parts) |

*1 0.05 part of p-benzoquinone is further added to Components A-17 and A-18.
*2 TAA = Diisopropoxytitan bis acetylacetonate.
*3 TPT = Tetraisopropoxytitan.

Three combinations of Components A-15 and A-16 and Components B-2 to B-4 were formed as indicated in the following table to test their performance characteristics in the same way as set forth in the preceding Examples. The results were as follows.

| Example No. | Components A | Components B | Hardening Time, min. | Pullout Strength Time, min. | Pullout Strength Load, kg. | (Temperature, 28°C) Breakthrough Torque Time, min. | (Temperature, 28°C) Breakthrough Torque Torque, kg-cm |
|---|---|---|---|---|---|---|---|
| 15 | A-15 | B-2 | 5 – 6 | 15 | 130 | 15 | 70 |
| 16 | A-16 | B-3 | 10 – 13 | 20 | 105 | 20 | 80 |
| 17 | A-16 | B-4 | 8 – 10 | 15 | 180 | 15 | 110 |

Examples 18 and 19
Components A-17 and A-18 were formed as indicated below:

| Component | Monomeric Base (100 parts) | Metal Chelate Compound | Additive*1 |
|---|---|---|---|
| A-17 | 3GM | TAA*2 (0.3 part) | triethylamine (2 parts) |
| A-18 | 3GM | TPT*3 (0.28 part) acetylacetone (0.2 part) | triethylamine (2 parts) |

*1 0.05 part of p-benzoquinone is further added to Components A-17 and A-18.
*2 TAA = Diisopropoxytitan bis acetylacetonate.
*3 TPT = Tetraisopropoxytitan.

These Components A-17 to A-18 were respectively combined with Component B-1 to test the performance characteristics of the resultant compositions. The results are tabulated below.

| Example No. | Component | Hardening Time, min. | Pullout Strength Time, min. | Pullout Strength Load, kg. | (Temp., 28°C) Breakthrough Torque Time, min. | (Temp., 28°C) Breakthrough Torque Torque, kg-cm. |
|---|---|---|---|---|---|---|
| 18 | A-17 | 8–10 | 30 | 100 | 15 | 50 |
| 19 | A-18 | 10–12 | 30 | 90 | 15 | 55 |

We claim:

1. A two-component system which comprises a first component and a second component stored separately and which is to be hardened when the two components are mixed in approximately equal amounts:

said first component being a composition comprising 100 parts by weight of a monomeric base material consisting essentially of at least one member selected from the group of vinyl compounds consisting of glycol diacrylates, glycol dimethacrylates, trimethylol propane trimethacrylate, pentaerythritol tetramethyacrylate, dimethacrylate bis (ethylene glycol) phthalate, 2-hydroxyethyl methacrylate, and a urethane acrylate monomer having a urethane linkage prepared by the reaction of toluene diisocyanate and 2-hydroxyethyl methacrylate, 0.001 to 5 parts by weight of a metal chelate compound selected from the group consisting of β-diketone chelates and ketoester chelates of metals of the class consisting of titanium, vanadium, chromium, manganese, iron, cobalt and nickel, and 0.001 to 0.5 parts by weight of a stabilizer adapted to maintain the first composition stable; and said second component being a composition comprising 100 parts by weight of a monomeric base material consisting essentially of at least one of said group of vinyl compounds, 0.01 to 10 parts by weight of a peroxide selected from the group consisting of organic hydroperoxides, ketone peroxides, alkyl peroxides, and alkyl peresters, and 0.001 to 0.2 parts by weight of a stabilizer adapted to maintain the second composition stable.

2. The two-component system according to claim 1, in which the monomeric base material of each of said first and second compositions comprises one of said vinyl compounds in combination with a monomeric compound selected from the group consisting of glycidyl methacrylate, methylol acrylamide, vinyl acetate, styrene, alkyl acrylates and alkyl methacrylates.

3. The two-component system according to claim 1, in which the monomeric base material of each of said first and second compositions comprises a member selected from the group of glycol dimethacrylates consisting of ethylene glycol dimethacrylate, diethylene glycol dimethacrylate, and tetraethylene glycol dimethacrylate.

4. The two-component system according to claim 1, in which the monomeric base material of each of said first and second compositions comprises a member selected from the group of glycol diacrylates consisting of diethylene glycol diacrylate and tetraethylene glycol diacrylate.

5. The two-component system according to claim 1, in which said metal chelate compound is a member selected from the group consisting of vanadium oxyacetylacetonate, di-isopropoxytitanium bis (acetylacetonate), di-isopropoxytitanium bis (methylacetoacetate), cobalt (III) acetylacetonate, chromium (III) acetylacetonate, and manganese acetylacetonate.

6. The two-component system according to claim 1, in which said peroxide is selected from the group consisting of cumene hydroperoxide, t-butylhydroperoxide, di-t-butyl peroxide, t-butylperacetate, and methylethylketone peroxide.

7. The two-component system according to claim 1, in which said stabilizer is p-benzoquinone.

8. The two-component system according to claim 1, in which each of said first and second compositions contains a hardening accelerator.

* * * * *